United States Patent
Ullén et al.

(10) Patent No.: US 8,666,091 B2
(45) Date of Patent: Mar. 4, 2014

(54) METHOD FOR REDUCING A DISTURBANCE IN AN INPUT SIGNAL CAUSED BY AN OUTPUT SIGNAL IN A MULTI-PORT CONNECTOR, MULTI-PORT CONNECTOR, AND MOBILE DEVICE

(75) Inventors: Kaj Ullén, Bjärred (SE); Martin Eriksson, Lomma (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1125 days.

(21) Appl. No.: 12/157,835

(22) Filed: Jun. 13, 2008

(65) Prior Publication Data

US 2009/0310798 A1   Dec. 17, 2009

(51) Int. Cl.
*H04B 15/00*   (2006.01)

(52) U.S. Cl.
USPC ............. 381/94.1; 381/96; 455/570; 370/286

(58) Field of Classification Search
USPC ..................... 381/94.1, 96; 455/570; 370/286
See application file for complete search history.

(56) References Cited

U.S. PATENT DOCUMENTS

| | | | | |
|---|---|---|---|---|
| 5,894,513 | A | * | 4/1999 | Nasu ........................ 379/388.07 |
| 2004/0018860 | A1 | | 1/2004 | Hoshuyama |
| 2007/0032130 | A1 | | 2/2007 | Yoshino |
| 2007/0042811 | A1 | | 2/2007 | Chen |
| 2009/0041263 | A1 | * | 2/2009 | Hoshuyama ................. 381/94.1 |

FOREIGN PATENT DOCUMENTS

| | | |
|---|---|---|
| CN | 1843053 | 10/2006 |
| CN | 1967940 | 5/2007 |
| CN | 101175101 | 5/2008 |
| CN | 201066840 | 5/2008 |
| EP | 1128693 | 8/2001 |
| GB | 2358317 | 7/2001 |
| JP | 10-209951 | 8/1998 |
| WO | 98/00960 | 1/1998 |
| WO | 00/74350 | 12/2000 |
| WO | 2007/042855 | 4/2007 |

OTHER PUBLICATIONS

International Search Report for International Application PCT/EP2008/010474 dated Mar. 17, 2009.

* cited by examiner

*Primary Examiner* — Howard Weiss
(74) *Attorney, Agent, or Firm* — Edwards Wildman Palmer LLP; Peter F. Corless; Steven M. Jensen

(57) ABSTRACT

A method for reducing a disturbance in an input signal caused by an output signal in a multi-port connector, a multi-port connector circuit for reducing a disturbance in an input signal caused by an output signal, and a mobile device are described.

21 Claims, 1 Drawing Sheet

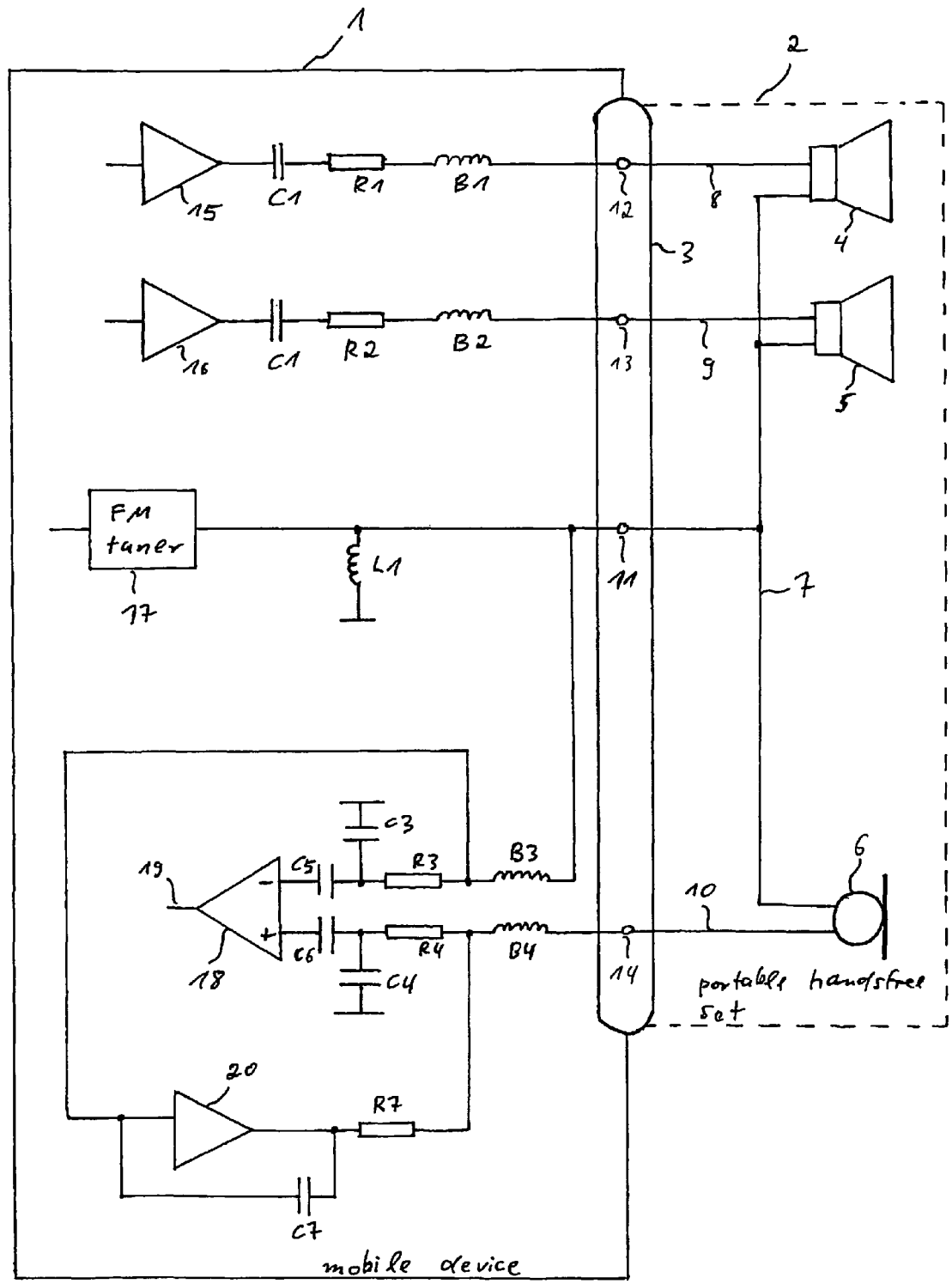

METHOD FOR REDUCING A DISTURBANCE IN AN INPUT SIGNAL CAUSED BY AN OUTPUT SIGNAL IN A MULTI-PORT CONNECTOR, MULTI-PORT CONNECTOR, AND MOBILE DEVICE

BACKGROUND OF THE INVENTION

The present invention relates to a method for reducing a disturbance in an input signal caused by an output signal in a multi-port connector, a multi-port connector, and a mobile device.

BRIEF SUMMARY OF THE INVENTION

According to an embodiment of the present invention, a method for reducing a disturbance in an input signal caused by an output signal in a multi-port connector is provided. The multi-port connector comprises an input port adapted to receive the input signal, an output port adapted to output the output signal, and a common port connected to a signal path used by the input signal and the output signal in common. The method comprises the steps of detecting a reference signal at the common port, generating a disturbance reduction signal from the reference signal, and correcting the input signal by means of the disturbance reduction signal. The reference signal detected at the common port comprises the disturbance in the input signal caused by the output signal.

In such a multi-port connector the input signal may be disturbed due to the common usage of the signal path by the input signal and the output signal at the common port of the multi-port connector. Therefore, the disturbance in the input signal can reliably be reduced by correcting the input signal by means of the disturbance reduction signal generated from the reference signal detected at the common port.

According to an embodiment, the method comprises the additional step of receiving the input signal from a microphone connected to the input port and the common port. Furthermore, the method may comprise the step of outputting the output signal to a loudspeaker connected to the output port and the common port. Additionally, the method may comprise the step of receiving an antenna signal of an antenna connected to the common port. As the common port is connected to a signal path used by the input signal, the output signal and the antenna signal in common, a disturbance in the input signal is substantially caused by the output signal and comprises for example an electrical echo between the output signal to the loudspeaker and the input signal from the microphone. This disturbance is comprised in the signal of the common port, and therefore the disturbance reduction signal can appropriately be generated from a reference signal detected at the common port.

According to an embodiment, the step of detecting the reference signal comprises a filtering of a signal of the common port. By filtering the signal of the common port, by for example a low pass filter, the antenna signal can be suppressed and the reference signal comprises substantially a signal corresponding to the disturbance in the input signal caused by the output signal.

Furthermore, according to an embodiment, the step of generating the disturbance reduction signal comprises a providing the reference signal with a constant offset signal. The constant offset signal may be a constant offset voltage used to supply a bias current to the microphone connected to the input port and the common port.

According to another embodiment, the step of correcting the input signal comprises an adding of the disturbance reduction signal to the input signal. Adding or superimposing the disturbance reduction signal to the input signal provides a reliable and cost effective method for reducing the disturbance in the input signal.

According to a further embodiment, the multi-port connector may comprise an additional output port adapted to output an additional output signal. In this case, the signal path connected to the common port is additionally used by the additional output signal, i.e., the signal path is now used by the input signal, the output signal, and the additional output signal in common. A multi-port connector designed in such a way may suitably be used when connecting stereo headphones, a microphone and an antenna to, for example, a mobile device like a mobile phone. This multi-port connector comprises four ports: an input port for the microphone, two output ports for the two loudspeakers or ear speakers of the stereo headphone, and a common port used as a common return path for the input signal of the microphone and the two output signals of the headphone and additionally used as an input for an antenna of for example a frequency modulated (FM) radio broadcast tuner or receiver of the mobile device.

According to another embodiment of the present invention, a multi-port connector circuit for reducing a disturbance in an input signal caused by an output signal is provided. The multi-port connector circuit comprises an output port configured to output the output signal, an input port configured to receive the input signal, a common port connected to a signal path used by the input signal and the output signal in common, and a disturbance reduction circuit connected to a common port and an input port. The disturbance reduction circuit is configured to detect a reference signal at the common port, to generate a disturbance reduction signal from the reference signal, and to correct the input signal by means of the disturbance reduction signal. The reference signal detected at the common port comprises the disturbance in the input signal with the disturbance substantially being caused by the output signal. The input port may be adapted to receive an input signal from a microphone connected to the input port and the common port. Furthermore, the output port may be adapted to output an output signal to a loudspeaker or to an earspeaker connected to the output port and the common port, and the common port may be adapted to receive an antenna signal of an antenna connected to the common port.

When connecting a microphone, a loudspeaker and an antenna as described above using a common port connected to a signal path used by the input signal of the microphone, the output signal of the loudspeaker and the antenna signal in common, a disturbance in the input signal is substantially caused by the output signal, for example as an electrical echo from the output signal in the input signal. By using the above-described disturbance reduction circuit connected to the common port and the input port, the disturbance in the input signal can be reliably reduced, as the disturbance reduction circuit is configured to detect the reference signal comprising the disturbance in the input signal caused by the output signal at the common port, to generate a disturbance reduction signal from the reference signal, and to correct the input signal by means of the disturbance reduction signal.

According to an embodiment, the disturbance reduction circuit comprises a filtering means adapted to filter a signal of the common port to provide the reference signal. The filtering means may comprise for example a bead, a ferrite bead, or a coil. Digital filtering means in combination with corresponding analog-to-digital and digital-to-analog converter may be used as well. The filtering means may be adapted to provide a low-pass filtering of the signal of the common port to suppress a high frequency part of the signal comprising the antenna signal of for example an FM radio broadcast signal in the so-called very high frequency (VHF) band. By suppressing the higher frequencies by the filtering means, a reference signal can be provided which substantially comprises the disturbance in the input signal caused by the output signal.

According to an embodiment, the disturbance reduction circuit comprises a regulator means adapted to provide the reference signal with a constant offset signal to generate the disturbance reduction signal. The constant offset signal may be used to supply a bias current to the microphone connected to the input port and the common port.

The disturbance reduction circuit of the multi-port connector circuit may furthermore comprise an adding means adapted to add the disturbance reduction signal to the input signal. The adding means may be realized by inputting the disturbance reduction signal and the input signal into an amplifier for amplifying the input signal, thus superimposing the disturbance reduction signal and the input signal at a low cost.

The multi-port connector of the multi-port connector circuit may comprise an additional output port configured to output an additional output signal. In this case, the signal path connected to the common port is additionally used by a return path of the additional output signal. An additional loudspeaker may be connected to the additional output port providing in combination with the loudspeaker connected to the output port a stereo audio output.

According to an embodiment of the present invention, a mobile device is provided. The mobile device comprises a multi-port connector comprising an output port, an input port, and a common port. The mobile device furthermore comprises an output circuit adapted to output a low frequency audio output signal via the output port and the common port, an input circuit adapted to receive a low frequency audio input signal via the input port and the common port, and a disturbance reduction circuit connected to the common port and the input port. The disturbance reduction circuit is configured to detect a reference signal at the common port, to generate a disturbance reduction signal from the reference signal, and to correct the input signal by means of the disturbance reduction signal. The reference signal detected at the common port comprises a disturbance in the input signal caused by the output signal. When outputting a low frequency audio output signal and receiving a low frequency audio input signal via a multi-port connector using a common port connected to the output circuit and the input circuit, a disturbance in the input signal caused by the output signal can be reliably reduced by the disturbance reduction circuit connected to the common port and the input port and being configured as described above.

According to an embodiment, the input port of the mobile device is adapted to receive the input signal from a microphone connected to the input port and the common port. Furthermore, the output port of the mobile device may be adapted to output the output signal to a loudspeaker connected to the output port and the common port. Additionally, the mobile device may comprise a radio frequency receiver adapted to receive a radio frequency signal via an antenna connected to the common port. The radio frequency receiver may be adapted to receive a frequency modulated (FM) radio frequency signal in the VHF band. By connecting the microphone, the loudspeaker and the antenna to the common port, the multi-port connector can be designed very small and cost-effective, as it comprises only three ports: the input port, the output port and the common port. As the mobile device comprises the disturbance reduction circuit, the disturbance in the input signal caused by the output signal due to a common usage of the common port can be reliably reduced. Therefore, a cost-efficient and high quality portable hands-free set comprising a loudspeaker or earspeaker, a microphone, and an antenna can be connected to the mobile device via the multi-port connector.

According to an embodiment, the disturbance reduction circuit of the multi-port connector circuit comprises a filtering means adapted to filter a signal of the common port to provide the reference signal. The main disturbance on the input signal is caused by the output signal as the input signal and the output signal use the common port as a return path for both signals in common. However, as the antenna signal is also passed via the common port to the radio frequency receiver, the filtering means helps to decouple the antenna signal from the input signal. The filtering means may be realized as a low-pass filter cutting off frequencies above the frequency of the lower frequency audio input signal, for example cutting off frequencies above 10 or 20 kHz. As no steep filter edge is required, the filtering means may be realized as a coil or bead.

According to a further embodiment, the disturbance reduction circuit of the multi-port connector circuit comprises a regulator means adapted to provide the reference signal with a constant offset signal to generate the disturbance reduction signal. The constant offset signal may be used to supply a bias current to the microphone connected to the input port and the common port.

Furthermore, the disturbance reduction circuit may comprise an adding means adapted to add the disturbance reduction signal to the input signal. When generating the disturbance reduction signal as described above from the reference signal detected at the common port, the disturbance reduction signal may comprise a signal which corresponds substantially to the disturbance in the input signal caused by the output signal and having the opposite sign. Therefore, adding this disturbance reduction signal to the input signal removes substantially the disturbance in the input signal.

According to another embodiment, the multi-port connector comprises an additional output port, and the mobile device comprises furthermore an additional output circuit adapted to output an additional low frequency audio output signal via the additional output port and the common port. The additional output port in combination with the output port can provide an output of a stereo audio output signal. As the additional output signal is output via the additional output port and the common port, only one additional port at the multi-port connector is needed. A disturbance caused by the output signal and the additional output signal in the input signal, which may be provided by a microphone, can nevertheless be efficiently reduced by the above-described disturbance reduction circuit connected to the common port, as the disturbance reduction circuit in this case detects a reference signal which comprises a disturbance in the input signal caused by the output signal and by the additional output signal. Therefore, the disturbance in the input signal caused by the two output signals is efficiently reduced.

According to an embodiment, the mobile device comprises a mobile phone, a personal digital assistant (PDA) or a mobile computer. Especially in these devices, portable hands-free sets (PHF) comprising a microphone, an earspeaker or a stereo earspeaker, and additionally an antenna for an FM tuner, are connected via a multi-port connector. Therefore, the above-described disturbance reduction circuit helps to reduce the disturbance in the input signal of the microphone whereby, at the same time, the number of ports of the multi-port connector is kept at a minimum. The above-referenced mobile devices, especially a mobile phone, may provide stereo playback of music, for example from a built in MP3 or MPEG player, an FM radio broadcast receiver, and an input for receiving an audio signal from for example a microphone for transmitting the audio signal via for example a cell-based telecommunication system. When using this mobile device in combination with a portable hands-free set, the portable hands-free set may comprise two earspeakers, an FM antenna integrated e.g. in the wiring to the earspeakers, and a microphone. As the mobile devices are usually very small, a multi-port connector having as few ports as possible is used for connecting the portable hands-free set with the mobile device. With the mobile device having the disturbance reduction circuit as described above, only four ports are required as described above, and by reducing the disturbance in the input signal caused by the output signals, a high transmission quality of the input signal can be achieved.

BRIEF DESCRIPTION OF THE DRAWING

Hereinafter, exemplary embodiments of the invention will be described with reference to the drawing.

The single FIGURE is a schematic view of a part of a mobile device comprising a multi-port connector circuit according to an embodiment of the invention.

DETAILED DESCRIPTION OF THE INVENTION

In the following, exemplary embodiments of the present invention will be described in detail. It is to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

It is also to be understood that in the following detailed description of the exemplary embodiments, any direct connection or coupling between functional blocks, devices, components or other physical or functional units shown in the drawing or description herein could also be implemented by an indirect connection or coupling.

It is further to be understood that the features of the various exemplary embodiments described herein may be combined with each other, unless specifically noted otherwise.

The FIGURE shows an embodiment of a mobile device 1 connected to a portable hands-free set 2 via a multi-port connector 3. The portable hands-free set 2 comprises two earspeakers or loudspeakers 4, 5 for reproducing a stereo audio signal to a user of the portable hands-free set 2, a microphone 6 for receiving audio signals, for example speech, and a wiring 7-10 connecting the loudspeakers 4, 5 and the microphone 6 to the multi-port connector 3.

The multi-port connector 3 comprises for example four ports 11-14 for providing electrical connections from the portable hands-free set 2 to the mobile device 1. As illustrated in the FIGURE, port 12 is connected to a first terminal of loudspeaker 4 via the wire 8, port 13 is connected to a first terminal of loudspeaker 5 via the wire 9, and port 14 is connected to a first terminal of the microphone 6 via the wire 10. A second terminal of the loudspeaker 4, a second terminal of the loudspeaker 5 and a second terminal of the microphone 6 are connected together to port 11 via the wire 7. Wire 7 additionally serves as an antenna for receiving for example a frequency modulated (FM) broadcast radio signal in for example the very high frequency (VHF) band.

The mobile device 1 comprises two earspeaker amplifiers 15, 16 adapted to drive the earspeakers or loudspeakers 4, 5 via blocking capacitors C1, C2, small resistors R1, R2 and beads B1, B2 as shown in FIG. 1. The capacitors C1, C2 may have a capacity in the range of for example 220 µF, and the resistors R1, R2 may have a resistance in the range of 10Ω. These values, however, are only exemplary values. The beads B1, B2 may be ferrite beads and are used for isolating the FM antenna and to protect the amplifiers 15, 16 from a current clamp. The current clamp is a test signal applied to the ports 11-14 of the multi-port connector 3 during a type approval test of the mobile device 1. The current clamp signal introduces an amplitude modulated (AM) disturbance signal on the ports 11-14 of the multi-port connectors 3 during the type approval test. The beads provide a very high resistance at high frequencies, for example 1.8 kΩ at 100 MHz, and a low resistance at low frequencies, for example 100Ω at 10 MHz and 1Ω at 100 kHz, thus protecting the mobile device 1 from high frequency current clamp signals.

The mobile device 1 furthermore comprises an FM tuner 17 having its antenna input connected to port 11 of the multi-port connector 3 for receiving FM radio broadcast signals via the wire 7 of the portable hands-free set 2 acting as an antenna. Port 11 of the multi-port connector 3 is additionally used as a return path of the loudspeaker current provided from the amplifiers 15, 16 and returned via the loudspeakers 4, 5 and wire 7 to port 11. This return path of the loudspeaker current is fed to ground via inductivity L1 which is also called FM antenna tuning coil L1.

The mobile device 1 comprises furthermore a microphone amplifier 18 connected with its positive input via a blocking capacitor C6, a filter composed of capacitor C4 and resistor R4, and a bead B4 via connector 14 and the wire 10 to the first terminal of the microphone 6. The negative input of amplifier 18 is connected via a blocking capacitor C5, a filter composed of a capacitor C3 and a resistor R3, and a bead B3 via common connector 11 and wire 7 to the second terminal of the microphone 6. The filters composed of resistor R3 and capacitor C3, and resistor R4 and capacitor C4, respectively, are used for filtering current clamp carrier frequencies during type approval tests of the mobile device 1. Capacitors C5 and C6 are used as blocking capacitors and may have a value of 100 nF, for example. The beads B3 and B4 are used to isolate the FM antenna and to reject higher current clamp frequencies. The output 19 of amplifier 18 provides an amplified electrical signal corresponding to an audio signal received by the microphone 6.

In the above-described circuit of the mobile device 1, a common return path of the loudspeakers 4, 5 and the microphone 6 is guided via the common port 11 of the multi-port connector 3. Additionally, an FM antenna signal is transmitted via the common port 11. Therefore, common port 11 cannot be connected directly to the ground, as this would suppress the received antenna signal. Therefore, the FM antenna tuning coil L1 is connecting common port 11 to ground providing a return path to ground for the low frequency signals of the loudspeakers 4, 5 and the microphone 6.

However, this coil L1 causes both audio crosstalk and electrical echo between the loudspeakers 4, 5 and the microphone 6. Therefore, the mobile device comprises additionally a disturbance reduction circuit eliminating the electrical echo by using a floating bias generator and a semi-balanced microphone amplifier connection. In this embodiment, the bias generator is realized as a regulator 20 which is stabilized by a capacitor C7. The regulator 20 is floating and provides a constant offset voltage for driving a bias current for the microphone 6. The offset voltage may be in the range of 2.0 V to 2.5 V, e.g. 2.4 V. An input of the regulator 20 is connected to the signal of the common port 11 after this signal has been filtered by bead B3. Bead B3 removes the FM antenna signal such that the input of regulator 20 has its reference on the negative signals of the loudspeakers 4, 5. Therefore, the output of regulator 20 provides the offset voltage and the negative signals of the loudspeakers 4, 5 constituting the audio crosstalk and electrical echo on the input signal of the microphones present at port 14. The output signal of regulator 20 is then fed via a resistor R7 to the input circuit of the positive input of the microphone amplifier 18 and is thus added to the input signal of the microphone 6. This creates a common mode biasing of the microphone and reduces or completely suppresses the disturbance in the input signal of the microphone 6 caused by the output signals for the loudspeakers 4, 5. The value of resistor R7 may be for example 2.2 kΩ.

The embodiment described above with reference to the FIGURE may be realized by several components on a printed circuit board or may be realized in an integrated circuit on a semiconductor chip or as a combination thereof. Furthermore, the embodiments described above may not only be used in a mobile device like a mobile phone, a personal digital assistant or a mobile computer, but may also be used in any other mobile or non-mobile device comprising a multi-port connection. It is also to be understood that all the embodiments described above are considered to be comprised by the present invention as it is defined by the appended claims.

What is claimed is:

1. A multi-port connector circuit, comprising
   an output port configured to output an output signal;
   an input port configured to receive an input signal;
   a single common port connected to a signal path used by the input signal and the output signal in common, wherein the output port and the common port are configured to be coupled to a loudspeaker for outputting the output signal to the loudspeaker, the input port and the common port are configured to be coupled to a microphone for receiving the input signal from the microphone, and the common port is configured to connect to an external electrical conductor, which is electrically connected to both the loudspeaker and the microphone; and
   a disturbance reduction circuit connected to the common port and the input port, the disturbance reduction circuit being configured to detect a reference signal at the common port, to generate a disturbance reduction signal from the reference signal, and to correct the input signal by means of the disturbance reduction signal, wherein the reference signal comprises a disturbance in the input signal caused by the output signal,
   the output port, the input port, and the common port being arranged side-by-side on an outside of a mobile device so as to be accessible from external to the mobile device.

2. The multi-port connector circuit according to claim 1, wherein the input port is adapted to receive the input signal from the microphone connected to the input port and the common port.

3. The multi-port connector circuit according to claim 1, wherein the output port is adapted to output the output signal to the loudspeaker connected to the output port and the common port.

4. The multi-port connector circuit according to claim 1, wherein the common port is further adapted to receive an antenna signal of an antenna connected to the common port.

5. The multi-port connector circuit according to claim 1, wherein the disturbance reduction circuit comprises a filtering device adapted to filter a signal of the common port to provide the reference signal.

6. The multi-port connector circuit according to claim 1, wherein the disturbance reduction circuit comprises a regulator device adapted to provide the reference signal with a constant offset signal to generate the disturbance reduction signal.

7. The multi-port connector circuit according to claim 1, wherein the disturbance reduction circuit comprises an adding device adapted to add the disturbance reduction signal to the input signal.

8. The multi-port connector circuit according to claim 1, wherein the multi-port connector circuit comprises an additional output port configured to output an additional output signal, and wherein the signal path connected to the common port is additionally used by the additional output signal.

9. A mobile device, comprising:
   a multi-port connector comprising an output port, an input port, and a single common port;
   an output circuit adapted to output an output signal via the output port and the common port;
   an input circuit adapted to receive an input signal via the input port and the common port, wherein the output port and the common port are configured to be coupled to a loudspeaker for outputting the output signal to the loudspeaker, the input port and the common port are configured to be coupled to a microphone for receiving the input signal from the microphone, and the common port is configured to connect to an external electrical conductor, which is electrically connected to both the loudspeaker and the microphone; and
   a disturbance reduction circuit connected to the common port and the input port, the disturbance reduction circuit being configured to detect a reference signal at the common port, to generate a disturbance reduction signal from the reference signal, and to correct the input signal by means of the disturbance reduction signal, wherein the reference signal comprises a disturbance in the input signal caused by the output signal,
   the output port, the input port, and the common port being arranged side-by-side on an outside of the mobile device so as to be accessible from external to the mobile device.

10. The mobile device according to claim 9, wherein the input port is adapted to receive the input signal from the microphone connected to the input port and the common port.

11. The mobile device according to claim 9, wherein the output port is adapted to output the output signal to the loudspeaker connected to the output port and the common port.

12. The mobile device according to claim 9, wherein the mobile device further comprises a radio frequency receiver adapted to receive a radio frequency signal via an antenna connected to the common port.

13. The mobile device according to claim 12, wherein the radio frequency receiver is adapted to receive a frequency modulated radio frequency signal in the very high frequency (VHF) transmission band.

14. The mobile device according to claim 9, wherein the disturbance reduction circuit comprises a filtering device adapted to filter a signal of the common port to provide the reference signal.

15. The mobile device according to claim 9, wherein the disturbance reduction circuit comprises a regulator device adapted to provide the reference signal with a constant offset signal to generate the disturbance reduction signal.

16. The mobile device according to claim 9, wherein the disturbance reduction circuit comprises an adding device adapted to add the disturbance reduction signal to the input signal.

17. The mobile device according to claim 9, wherein the multiport connector comprises an additional output port and the mobile device comprises an additional output circuit adapted to output an additional output signal via the additional output port and the common port.

18. The mobile device according to claim 17, wherein the additional output circuit is adapted to output an additional low frequency audio output signal as the additional output signal.

19. The mobile device according to claim 9, wherein the mobile device comprises a mobile phone, a personal digital assistant or a mobile computer.

20. The mobile device according to claim 9, wherein the output circuit is adapted to output a low frequency audio output signal as the output signal.

21. The mobile device according to claim 9, wherein the input circuit is adapted to receive a low frequency audio input signal as the input signal.

* * * * *